(12) United States Patent
Stephenson et al.

(10) Patent No.: US 7,023,996 B2
(45) Date of Patent: Apr. 4, 2006

(54) ENCRYPTION FOR ASYMMETRIC DATA LINKS

(75) Inventors: Gary V. Stephenson, Bellevue, WA (US); David S. Parkman, Mercer Island, WA (US); David W. Carman, Glenwood, MD (US)

(73) Assignee: The Boeing Company, Chicago, IL (US)

( * ) Notice: Subject to any disclaimer, the term of this patent is extended or adjusted under 35 U.S.C. 154(b) by 909 days.

(21) Appl. No.: 09/849,961

(22) Filed: May 4, 2001

(65) Prior Publication Data

US 2002/0164030 A1 Nov. 7, 2002

(51) Int. Cl.
*H04K 1/00* (2006.01)

(52) U.S. Cl. .................. 380/270; 380/271; 380/269; 380/33

(58) Field of Classification Search ............ 380/33, 380/271, 269, 270
See application file for complete search history.

(56) References Cited

U.S. PATENT DOCUMENTS

| | | | |
|---|---|---|---|
| 4,903,298 A | | 2/1990 | Cline |
| 4,969,190 A | | 11/1990 | Takaragi |
| 5,008,935 A | | 4/1991 | Roberts |
| 5,365,447 A | * | 11/1994 | Dennis ................. 701/215 |
| 5,548,646 A | * | 8/1996 | Aziz et al. .............. 713/153 |
| 5,592,555 A | | 1/1997 | Stewart |
| 5,708,963 A | * | 1/1998 | Mobley et al. .......... 455/12.1 |
| 5,793,871 A | * | 8/1998 | Jackson ................. 380/54 |
| 5,835,726 A | | 11/1998 | Shwed et al. |
| 5,966,442 A | | 10/1999 | Sachdev |
| 6,282,714 B1 | | 8/2001 | Ghori |
| 6,429,812 B1 | | 8/2002 | Hoffberg |
| 6,677,888 B1 | * | 1/2004 | Roy ................... 342/36 |

OTHER PUBLICATIONS

Request for Comments: 2406, Network Working Group, S. Kent, R. Atkinson, Nov., 1998.
RSA Laboratories Technical Note, Version 1.4, "RSA Data Security, Inc. Public–Key Cyrptography Standards (PKCS)", Nov. 1, 1993.
Network Working Group, Request for Comments: 2395, R. Frien, R. Monsou, Hi/fn, Inc., Dec. 1998.
Network Working Group, Request for Comments: 2393, A. Shac, Ci, R. Mons, Hi, R. Pere, TimeS, M. Tho, AltaVista Inter, Dec. 1, 1998.
Federal Information Processing Standards Publication 46–2, National Bureau of Standards, Dec. 30, 1993.
National Institute of Standards and Technology RIN 0693–ZA27, Announcing Draft Federal Information Processing Standard (FIPS) 46–3, Data Encryption Standard (DES), and Request for Comments, Federal Register: Jan. 15, 1999 (vol. 64, No. 10).

* cited by examiner

*Primary Examiner*—Gregory Morse
*Assistant Examiner*—Jacob Lipman
(74) *Attorney, Agent, or Firm*—Harness, Dickey & Pierce P.L.C.

(57) ABSTRACT

A method is provided for asymmetrically encrypting data communicated between a ground platform and multiple airborne platforms. The method includes packet encrypting ground-based data so as to preserve routing information while encrypting the remaining data. The packet-encrypted data is then transmitted to the airborne platforms. The method also includes bulk encrypting airborne-based data so as to maximize security. The bulk-encrypted data is then transmitted to the ground platform.

21 Claims, 3 Drawing Sheets

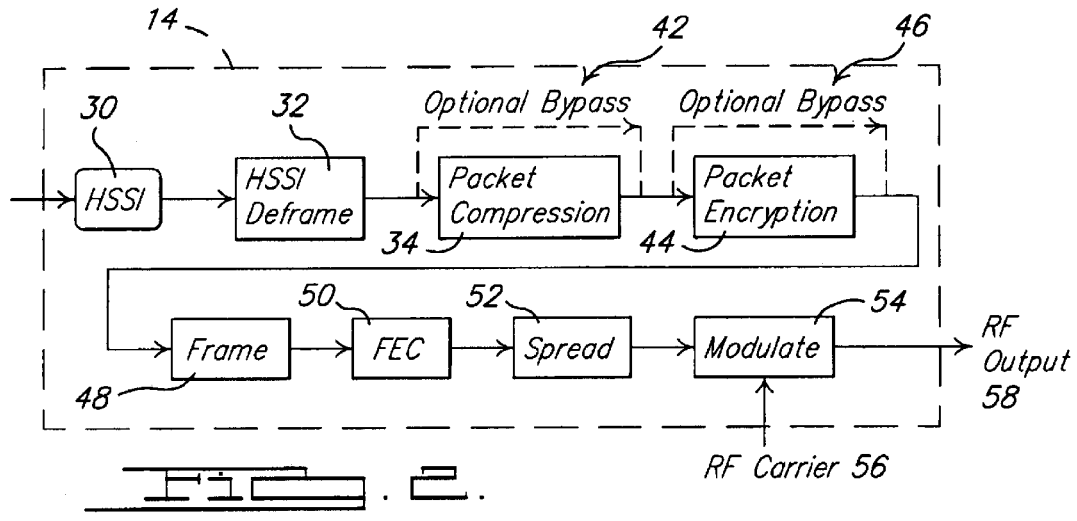
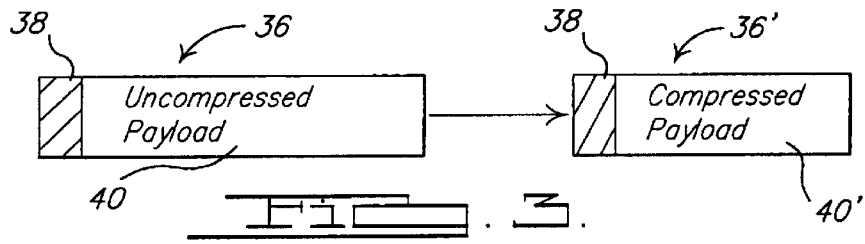
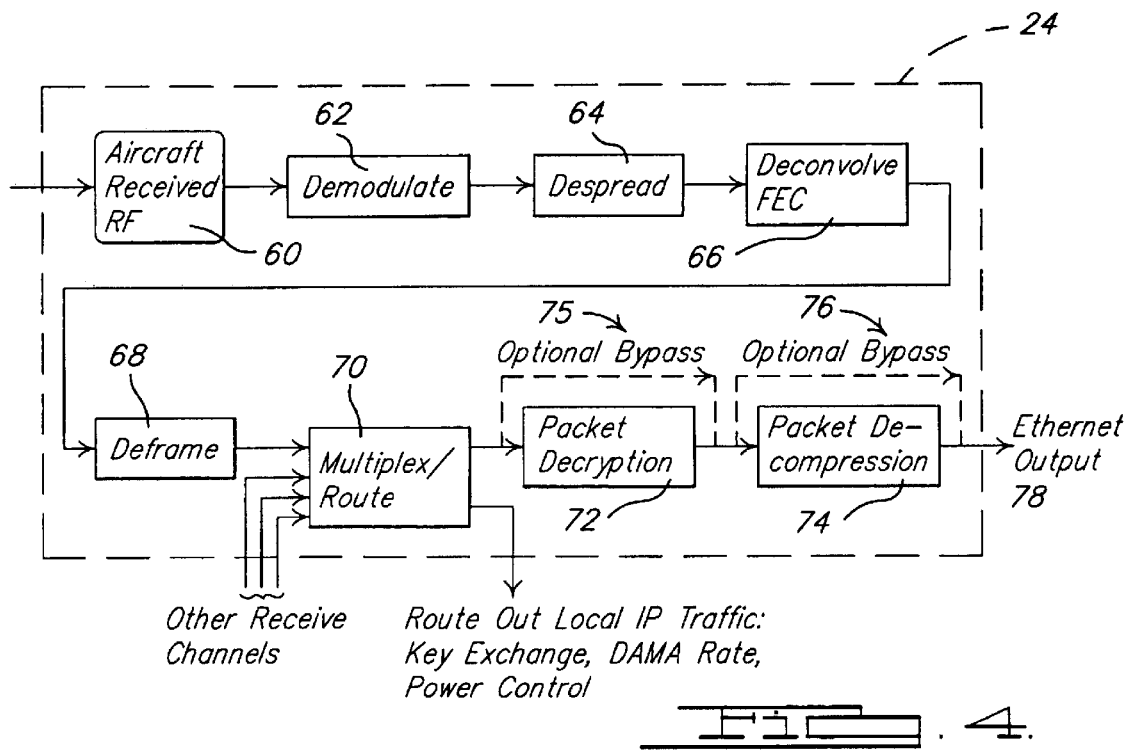

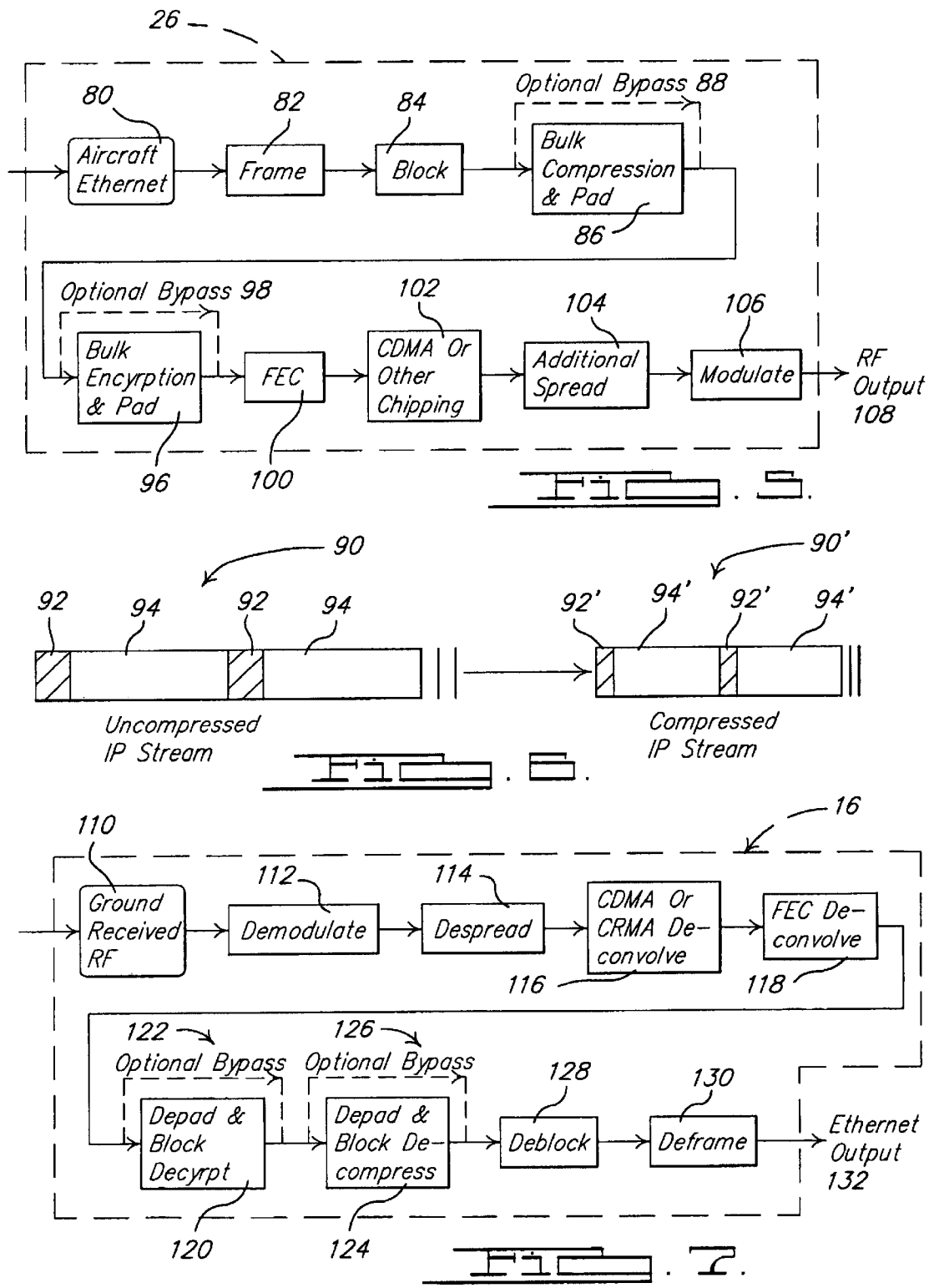

ENCRYPTION FOR ASYMMETRIC DATA LINKS

BACKGROUND OF THE INVENTION

1. Field of the Invention

The present invention generally relates to communication networks, and more particularly, to an asymmetric encryption technique for the forward and return links of a communication network.

2. Discussion

Radio frequency-based communication networks are used throughout the world to transmit data between sources. Such communication networks include transponders that transmit the data between the sources. The bandwidth available on transponders is extremely limited. This is particularly true for satellite-based transponders. Since bandwidth is so limited, its use is very expensive.

In order to minimize costs and increase efficiency, it is desirable to impart as much data as possible into the bandwidth available on any given transponder. One technique employed to exploit available bandwidth is compression. Compressed data has a lower data rate and, as such, consumes less bandwidth. This saves money and increases efficiency.

A recent advancement in communication networks raises a competing interest with respect to minimizing bandwidth consumption. The increasing use of routable data creates a need for uncompressed data. Routable data includes routing information in the form of an addressee identifier. Although this routable data is typically multicast, addressees scan incoming data for their own address. Only data bearing the particular addressee's identifier is accepted and utilized. The remaining data is discarded.

The most commonly employed compression technique treats a data stream in bulk format. According to this technique, all of the data in the stream is compressed. Unfortunately, addressee identifying information is lost if it is compressed using such a bulk technique. As such, this data is no longer routable. Similarly, the most commonly employed encryption technique treats a data stream in bulk format so that all of the data in the stream is encrypted. Addressee identifying information is lost if it is encrypted using such a bulk technique.

Very recently, a new technique has been developed which divides a data stream into a header containing the addressee identifying information and a package containing the remaining information. According to this technique, the package is compressed while the header remains uncompressed. As such, the routing information is preserved while the remaining information is compressed. Advantageously, some compression is performed so as to increase efficiency and save money while the header is preserved to maintain routing ability. Further, a new encryption technique is available for encrypting the package while leaving the header unencrypted. As such, some encryption is performed so as to increase security while the header is preserved to maintain routing ability.

In an aeronautical mobile communication environment, the communications network is conveniently divided into a forward link and a return link. Most communicating over the forward link, i.e., ground to air, includes a single transmitting source and multiple recipients. The data transmitted on the forward link typically includes routing information. In contrast, most communicating over the return link, i.e., air to ground, includes multiple transmitting sources and a single recipient. Consequently, the data transmitted on the return link is typically devoid of routing information.

In view of the differences in the data transmitted in the forward and return links of an aeronautical mobile communications network, it would be desirable to provide an asymmetric compression method that employs packet compression on the forward link to provide some compression while maintaining routing information and bulk compression on the return link to maximize compression for efficient use of available bandwidth. It would also be desirable to provide an asymmetric encryption method that employs packet encryption on the forward link to provide some encryption while maintaining routing information and bulk encryption on the return link to maximize security.

SUMMARY OF THE INVENTION

The above and other objects are provided by a method of asymmetrically encrypting data communicated between a single ground platform and multiple airborne platforms. The method includes a forward link including a packet encryptor for packet encrypting ground-based data so as to preserve routing information while encrypting the remaining data. The packet-encrypted data is then transmitted to the airborne platforms. The packet-encrypted data is received by the addressee specified airborne platform and decrypted. The method also includes a return link wherein airborne-based data is encrypted using a block encryptor so as to maximize security. The block-encrypted data is then transmitted to the ground platform. The block-encrypted data is decrypted at the ground platform.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a schematic illustration of the hardware and software components of a ground-based modem employing packet compression and encryption;

FIG. 3 is a schematic illustration of a data stream in an uncompressed state and in a packet compressed state;

FIG. 4 is a schematic illustration of the hardware and software components of an air-based modem employing packet decryption and de-compression;

FIG. 5 is a schematic illustration of the hardware and software components of an air-based modem employing bulk compression and encryption;

FIG. 6 is a schematic illustration of a data stream in an uncompressed state and in a bulk compressed state; and FIG. 7 is a schematic illustration of the hardware and software components of a ground-based modem employing block decryption and de-compression.

DETAILED DESCRIPTION OF THE PREFERRED EMBODIMENTS

Figure 1:
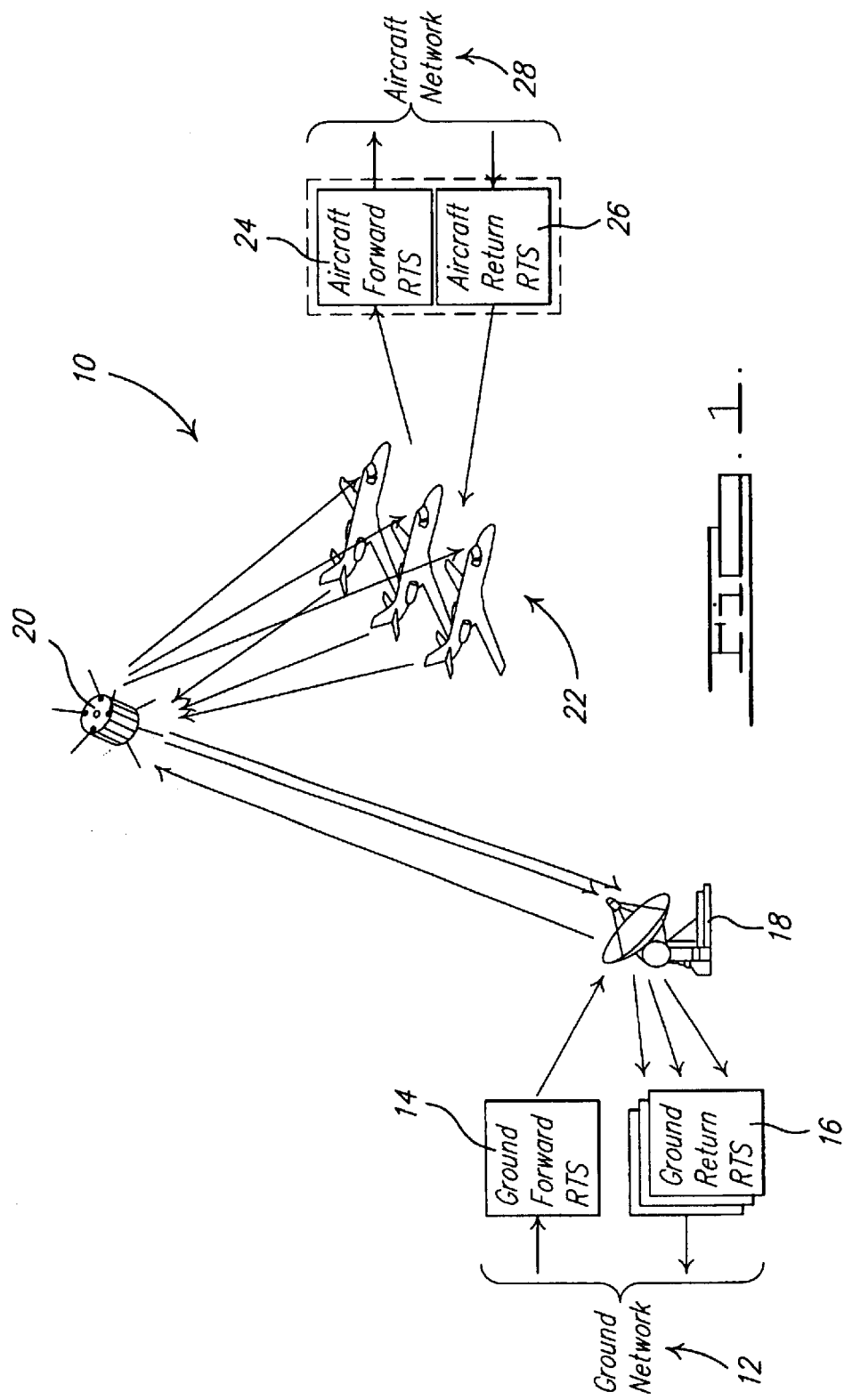
FIG. 1 is a schematic illustration of an aeronautical mobile communications network incorporating the teachings of the present invention.

The following description of the preferred embodiments is merely exemplary in nature and is in no way intended to limit the invention, its application, or uses. The present invention is generally directed towards an asymmetric communication network for an air traffic control system. More particularly, the communications network includes a forward link and a return link. Packet encryption is used on the forward link to preserve routing information while encrypting the remaining information. Bulk encryption is used on the return link where no routing information is employed to maximize security.

Turning now to the drawing figures, FIG. 1 illustrates the asymmetric communication network of the present invention generally at 10. The communication network 10 includes a ground network 12 having a ground forward receiver transmitter sub-system 14 and a plurality of ground return receiver transmitter subsystems 16. Information from the ground forward receiver transmitter subsystem 14 is broadcast by way of the ground station segment of the network or antenna 18, preferably in the form of a satellite dish. The antenna 18 also receives information for the ground return receiver transmitter subsystem 16.

A space segment of the network in the form of a satellite 20 serves as a link between the ground-based antenna 18 of the ground network 12 and a plurality of airborne platforms 22. The airborne platforms 22 serve as the airborne electronics segment of the network. Each airborne platform 22 includes an aircraft forward receiver transmitter subsystem 24 and an aircraft return receiver transmitter subsystem 26. The aircraft forward receiver transmitter subsystem 24 and aircraft return receiver transmitter subsystem 26 form part of an aircraft network 28.

As will be described in much greater detail below, in operation, the ground forward receiver transmitter subsystem 14 employs packet compression and encryption on data originating at the ground network 12. Antenna 18 sends the packet compressed and encrypted data from the ground forward receiver transmitter subsystem 14 to the satellite 20. The satellite 20 sends the packet compressed and encrypted data to the plurality of airborne platforms 22. The aircraft forward receiver transmitter subsystem 24 decompresses and decrypts the packet compressed and encrypted data received so that it may be employed in the aircraft network 28. The use of packet compression and encryption on the forward link of the network 10 enables routing information within the data stream to be preserved so that only select ones of the plurality of airborne platforms 22 are burdened with receipt and manipulation of this data.

For the return link, the aircraft return receiver transmitter subsystem 26 block compresses and encrypts data originating in the aircraft network 28. The airborne platform 22 forwards the block compressed and encrypted data to the satellite 20 which sends it along to the antenna 18. One of the ground return receiver transmitter subsystems 16 de-compresses and decrypts the block compressed and encrypted data from the antenna 18 for use at the ground network 12. The use of block compression and encryption on the return link of the network 10 enables maximum compression and security since no routing information need be preserved.

Turning now to FIG. 2, the ground forward receiver transmitter subsystem 14 of FIG. 1 will be further described. In general, the ground forward receiver transmitter subsystem 14 takes uncompressed and unencrypted digital input data and converts it to packet compressed and encrypted radio frequency output data.

The ground forward receiver transmitter subsystem 14 includes a high-speed serial interface 30 that receives and accepts the digital data input. The high-speed serial interface 30 receives and transmits the data in a plurality of frames. This framed data requires de-framing prior to compression and encryption. A de-framer 32 is employed for this purpose. After de-framing by the de-framer 32, pure digital data is output to a packet compressor 34.

It should be noted that the high-speed serial interface 30 and the high-speed serial interface de-framer 32 might not be required in some implementations. For example, if a pure Internet Protocol (IP) data stream is input to the ground forward receiver transmitter subsystem 14, no de-framing is required. Accordingly, an Ethernet input would eliminate the need for the high-speed serial interface 30 and de-framer 32.

The packet compressor 34 packet compresses the pure IP data stream. That is, the data header, which includes routing information, is separated from the data payload, which includes all other information and only the data payload is compressed. As such, the routing information within the data header is preserved.

Referring momentarily to FIG. 3, a schematic illustration of a data stream before and after packet compression by the packet compressor 34 of FIG. 2 is illustrated. The uncompressed data stream 36 includes an uncompressed data header 38 and an uncompressed data payload 40. The compressed data stream 36' includes the uncompressed data header 38 and a compressed data payload 40'. As can be appreciated, the partially compressed data stream 36' has a lower data rate than the uncompressed data stream 36. However, by maintaining the uncompressed data header 38, routing information is preserved.

Referring again to FIG. 2, an optional bypass 42 is provided around the packet compressor 34. The optional bypass 42 is provided for use when there is no need for compression. For example, compression may be undesired for control and test signals, as well as on very small data rates. Furthermore, if an error is detected within the packet compression technique, the packet compressor 34 can be avoided.

It should be noted that while other packet compressors may be available, it is presently preferred to employ internet protocol compression such as that described in Request For Comments No. 2395. Internet protocol compression, or IPcomp, is preferred since the routing information in the data stream is normally internet protocol addressed. One implementation of IPcomp is included in the HiFn 7711 security processor.

Packet encryptor 44 packet encrypts the packet-compressed data from packet compressor 34 or uncompressed data from the bypass 42. That is, only the data payload of the packet compressed data stream is encrypted. The uncompressed data header remains unencrypted. As such, the routing information within the data header is preserved.

Although other packet encryptors may be available, it is presently preferred to employ an internet protocol security technique such as that described in Request For Comments No. 2401 and 2406. Internet protocol security, or IPsec, is employed since the routing information in the data stream is normally internet protocol addressed. One implementation of IPsec is included in the HiFn 7711 security processor.

An optional bypass 46 is provided around the packet encryptor 44. The optional bypass 46 may be utilized when encryption is not required. For example, encryption may be undesired for control and test signals. Furthermore, if an error is detected within the packet encryption technique, the packet encryptor 44 can be avoided.

The packet encrypted data from the packet encryptor 44, or the unencrypted data from the bypass 46, is then framed at framer 48. Framing is necessary so that the data stream is in the proper format for spreading by the forward error corrector 50. That is, the data must be divided into frames that match the frames that are acceptable by the forward error correction code employed in the forward error corrector 50.

At the forward error corrector 50, the data rate of the packet compressed and encrypted data stream is increased to spread out the waveform so that the maximum available bandwidth will be consumed. By occupying the maximum available bandwidth, the signal to noise ratio of the signal is improved. Although other forward error correction codes are available, it is presently preferred to employ turbo product code implementation available from AHA as the AHA4540.

If necessary, the data may be further spread after application of the forward error correction code by the forward error corrector 50 by a spreader 52. For example, a chipping code could be applied at spreader 52 to further spread the signal.

After any additional spreading is performed at spreader 52, the packet compressed and encrypted data stream is modulated at modulator 54. At modulator 54, the packet compressed and encrypted signal is applied to a radio frequency carrier 56. Modulator 54 preferably modulates the data stream by way of an offset quadrature phase shift key (OQPSK). It should be noted however that other modulation techniques may be used such as pulse code modulation and frequency modulation. The resulting packet compressed and encrypted signal is the radio frequency output 58.

Referring now also to FIG. 1, the ground forward receiver transmitter sub-subsystem 14 sends the output signal 58 to the transponder of the satellite 20. The satellite 20 sends the output signal 58 to the plurality of airborne platforms 22. Each airborne platform scans the output signal 58 for its own internet protocol address. Only the platform with the matching address will receive the output signal 58. The other platforms will simply discard it.

Turning now to FIG. 4, and with continued reference to FIG. 2, the aircraft forward receiver transmitter sub-system 24 of FIG. 1 will be further described. In general, the aircraft forward receiver transmitter sub-system 24 reverses the compression, encryption, and other manipulation of the original data performed at the ground forward receiver transmitter subsystem 14. As such, the output signal 58 is initially received by the subsystem as input signal 60.

A demodulator 62 demodulates the input signal 60. That is, the demodulator 62 removes the data stream signal from the carrier signal 56. After demodulation, the signal is de-spread by de-spreader 64 as necessary. The de-spreader 64 reverses the chipping code or other spreading technique that may have been applied at spreader 52.

After any required de-spreading is performed at de-spreader 64, de-convolver 66 de-convolves the signal. In de-convolver 66, the method absorbs the signal frame by frame and de-convolves it by applying the inverse of any correction code applied at the forward error corrector 50. Next, the de-convolved signal from the de-convolver 66 is de-framed at de-framer 68. The de-framer 68 removes any framing and frame fill applied at framer 48.

From de-framer 68, the signal continues to router/multiplexer 70. The router/multiplexer 70 routes out local internet protocol traffic such as control or test signals which were not compressed or encrypted at the ground forward receiver transmitter sub-system 14 but rather traveled through the optional bypasses 42 and/or 46. The router/multiplexer 70 also receives other channels of the aircraft's communications network. That is, the aircraft forward receiver transmitter sub-system 24 may be one of a plurality of channels the aircraft employs for receiving radio frequency signals.

After routing and/or multiplexing at router/multiplexer 70, the signal is packet decrypted at packet decryptor 72. Alternatively, optional bypass 75 may be employed if the signal from the ground forward receiver transmitter sub-system 14 is not encrypted. At packet decryptor 72, the inverse packet encryption technique as that applied at packet encryptor 44 is applied to the signal.

The packet decrypted signal from packet encryptor 72, or the unencrypted signal from bypass 74, is then packet de-compressed at packet de-compressor 74. Alternatively, optional bypass 76 may be employed if the signal from the ground forward receiver transmitter sub-system 14 is not compressed. At the packet de-compressor 74, the inverse of the packet compression technique applied at packet compressor 34 is applied. For example, the inverse IP comp may be applied.

From the packet de-compressor 74 or optional bypass 76, a decrypted and de-compressed data stream 78 results. As with the original ground signal, the data stream 78 is in digital form. For example, the digital stream 78 may be an Ethernet or another internet protocol.

Turning now to FIG. 5, the aircraft return receiver transmitter sub-system 26 of FIG. 1 will be discussed in greater detail. As part of the return link of the network, the aircraft is transmitting data to a ground-based receiver. Since the ground-based receiver is the only possible recipient, no routing information is required. As such, a bulk compression and encryption technique can be employed to maximize compression and security of the data. A demand assigned multiple access (DAMA) approach such as Code Division Multiple Access (CDMA) can be employed on the return link so that a large number of users can employ the same transponder. Alternatively, frequency division multiple access (FDMA) could be used.

Still referring to FIG. 5, the aircraft return receiver transmitter sub-system 26 starts with the acquisition of aircraft-based information such as an aircraft Ethernet signal 80. If the initial signal is not in an Ethernet form, a high-speed serial interface and a high-speed serial interface de-framer may be employed to convert the initial signal to a digital format.

To prepare the signal 80 for compression and encryption, the signal 80 is framed at framer 82 and then blocked at blocker 84. The framed and blocked signal is then bulk compressed at bulk compressor 86. If compression is not desired, such as for a test or control signal, or if an error has been detected within the bulk compression technique, the optional bypass 88 may be used.

Referring momentarily to FIG. 6, a schematic illustration of a data stream before and after bulk compression by the bulk compressor 86 of FIG. 5 is illustrated. This schematic is notional only and may contain compression library information that is not shown in this level of detail. The uncompressed internet protocol data stream 90 includes uncompressed headers 92 and uncompressed payloads 94. The compressed internet protocol data stream 90' includes compressed headers 92' and compressed payloads 94'. As such, in contrast to the packet compression employed on the forward link which preserves the header in an uncompressed state, the bulk compression technique of the return link compresses the entire data stream. This maximizes compression for minimizing consumption of available bandwidth.

Referring again to FIG. 5, bulk compressor 86 also includes a padder. At times, very little return traffic may be occurring at the aircraft return receiver transmitter sub-system 26. The padder enables the methodology to wait a certain amount of time before sending out the compressed signal. In this way, more data may be gathered prior to simultaneous broadcast.

Although other bulk compressors are available, an LZS such as LZ77 and Hoffman code is currently preferred.

Bulk encryptor 96 bulk encrypts the bulk-compressed data signal from compressor 86, or the uncompressed signal from bypass 88. If no encryption is desired, such as, for example, on a control or test signal, or if an error is detected within the encryption technique, the optional bypass 98 may be employed.

Although other bulk encryptors are available, Triple Data Encryption Standard (3DES) is currently preferred. However, the advanced encryption standard (AES) will be preferred as soon as it is publicly available. 3DES is publicly available from the National Institute for Standards and Technology (NIST).

Bulk encryptor 96 also includes a padder similar to that employed with bulk compressor 86. The padder at bulk encryptor 96 further ensures that sufficient data is accumulated or a sufficient time period has elapsed prior to sending the signal from the aircraft.

A forward error controller 100 applies a forward error correction code to the bulk compressed and encrypted signal from the bulk encryptor 96 or the unencrypted signal from the optional bypass 98. The correction code increases the data rate of the bulk compressed and encrypted data stream to spread out the waveform so that the maximum available bandwidth will be consumed.

If further spreading and/or a DAMA operation is required, this is applied at chipper 102. On the return link, instead of applying a direct sequence spread spectrum as in the forward link, the method applies a chipping signal which is unique for every return link. The chipping signal is mixed with the original signal such that when it is de-chipped by a demodulator, the original signal is extracted. The chipping code assigned at chipper 102 enables the signal to be employed in a code division multiple access system (CDMA) or other multiple access system.

If still additional spreading is desired, this occurs at spreader 104. The spreader 104 ensures that the entire available bandwidth is consumed.

The signal is then modulated at modulator 106. At modulator 106, the bulk compressed and encrypted signal is applied to a radio frequency carrier. Modulator 106 preferably modulates the data stream by way of an offset quadrature phase shift key (OQPSK). It should be noted however that other modulation techniques may be used such as pulse code modulation and frequency modulation. The resulting bulk compressed and encrypted signal is the radio frequency output 108.

Although only one channel has been described with respect to the aircraft return receiver transmitter sub-system 26, it should be appreciated that multiple channels could also be employed.

Referring now also to FIG. 1, the bulk compressed and encrypted signal 108 from the aircraft return receiver transmitter sub-system 26 is sent from the airborne platform 22 by way of the transponder in the satellite 20 to the ground return receiver transmitter sub-system 16. At the ground return receiver transmitter sub-system 16, the reverse compression and encryption must be applied to return the radio frequency output signal 108 to its original state.

Turning now to FIG. 7, and with continued reference to FIG. 5, the ground return receiver transmitter sub-system 16 will be further described. The ground return receiver transmitter sub-system 16 starts with the ground received radio frequency signal 110 which is, for example, the radio frequency output signal 108. The radio frequency signal 110 is demodulated at demodulator 112. The demodulator 112 removes the radio frequency carrier applied at the modulator 106.

The demodulated signal is then de-spread at de-spreader 114. The de-spreader 114 removes any additional spreading which occurred at spreader 104. After de-spreading, the chipping is de-convolved at de-convolver 116. That is, a chipping code is running in de-convolver 116 that is searching for a particular chipping code in the signal 110. When this chipping code is identified, the attendant signal is extracted from the remaining channel noise. As such, the de-convolver 116 removes the CDMA or other chipping code applied at chipper 102.

The de-chipped signal is then additionally de-convolved at forward error corrector 118. The forward error corrector 118 applies the inverse of any correction code applied at forward error corrector 100. The resultant signal is then de-padded and block decrypted at decrypter 110.

The decrypter 120 removes the bulk encryption and padding applied at encrypter 96. To accomplish this, the decrypter 120 applies the inverse of the padding and encryption code to the signal. If no padding or encryption was applied by the encrypter 96, i.e., the option bypass 98 was employed, the optional bypass 122 may be utilized.

The decrypted signal is then de-padded and bulk de-compressed at de-compressor 124. The de-compressor 124 removes the bulk compression and padding applied at compressor 86. If no padding or compression was applied by the compressor 86, i.e., the optional bypass 88 was employed, the optional bypass 126 may be utilized.

The decrypted and de-compressed signal is then de-blocked at de-blocker 128. The de-blocker 128 applies the inverse blocking code that was as applied at blocker 84. The de-blocked signal is then de-framed at de-framer 130. The de-framer 130 removes any framing applied at framer 82. The resulting output signal 132 is thus restored to the original signal of the aircraft. For example, the signal 132 may be an Ethernet-type output signal.

Thus, an asymmetric communication network is provided. The communication network includes packet compression and encryption on the forward link and bulk compression and encryption on the return link. As such, routing information is preserved in the forward link and maximum compression and encryption is performed on the return link.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of transmitting data between a ground segment and a plurality of airborne segments comprising:

a forward link including:
  obtaining a first data stream at said ground segment, the first data stream including a data header having routing information and a data payload having other information;
  packet encrypting said first data stream to maintain said data header while encrypting said data payload;
  sending said packet encrypted first data stream to said plurality of airborne segments; and
  if said routing information in said data header matches an address of at least one of said plurality of airborne segments, decrypting said packet encrypted first data stream at least at said one of said plurality of said plurality of airborne segments; and
a return link including:
  obtaining a second data stream at least at one of said plurality of airborne segments;
  bulk encrypting said second data stream to encrypt all of said second data stream;
  sending said bulk encrypted second data stream to said ground segment; and
  decrypting said bulk encrypted second data stream at said ground segment.

2. The method of claim 1 further comprising framing said first data stream after said step of packet encrypting said first data stream and prior to said step of sending said packet encrypted first data stream to said plurality of airborne segments.

3. The method of claim 1 further comprising modulating said first data stream after said step of packet encrypting said first data stream and prior to said step of sending said packet encrypted first data stream to said plurality of airborne segments.

4. The method of claim 1 further comprising modulating said second data stream after said step of bulk encrypting said second data stream and prior to said step of sending said bulk encrypted second data stream to said ground segment.

5. The method of claim 1 further comprising spreading said first data stream after said step of packet encrypting said first data stream and prior to said step of sending said packet encrypted first data stream to said plurality of airborne segments.

6. The method of claim 5 wherein said spreading step further comprises applying a forward error correction code to said first data stream.

7. The method of claim 1 further comprising spreading said second data stream after said step of bulk encrypting said second data stream and prior to said step of sending said bulk encrypted second data stream to said ground segment.

8. The method of claim 7 wherein said spreading step further comprises applying a forward error correction code to said second data stream.

9. The method of claim 7 wherein said spreading step further comprises applying a chipping code to said second data stream.

10. The method of claim 1 wherein said step of decrypting said packet encrypted first data stream at least at said one of said plurality of airborne segments further comprises packet decrypting said first data stream.

11. The method of claim 10 further comprising de-modulating said first data stream prior to said step of decrypting said first data stream at said one of said plurality of airborne segments.

12. The method of claim 10 further comprising de-spreading said first data stream prior to said step of decrypting said first data stream at said one of said plurality of airborne segments.

13. The method of claim 12 wherein said de-spreading step further comprises applying an inverse forward error correction code to said first data stream.

14. The method of claim 10 further comprising de-framing said first data stream prior to said step of decrypting said first data stream at said one of said plurality of airborne segments.

15. The method of claim 1 wherein said step of decrypting said bulk encrypted second data stream at said ground segment further comprises bulk decrypting said second data stream.

16. The method of claim 15 further comprising de-modulating said second data stream prior to said step of decrypting said second data stream at said ground segment.

17. The method of claim 15 further comprising de-spreading said second data stream prior to said step of decrypting said second data stream at said ground segment.

18. The method of claim 17 wherein said de-spreading step further comprises applying an inverse chipping code to said second data stream.

19. The method of claim 17 wherein said de-spreading step further comprises applying an inverse forward error correction code to said second data stream.

20. The method of claim 1 further comprising packet compressing said first data stream prior to said step of sending said first data stream to said plurality of airborne segments.

21. The method of claim 20 further comprising bulk compressing said second data stream prior to said step of sending said second data stream to said ground segment.

* * * * *